Aug. 6, 1957 W. C. LANNING 2,802,202

GATING CIRCUIT

Filed July 13, 1955 2 Sheets-Sheet 1

INVENTOR
WALTER C. LANNING
BY R. V. Craddock
ATTORNEY

Aug. 6, 1957 W. C. LANNING 2,802,202

GATING CIRCUIT

Filed July 13, 1955 2 Sheets-Sheet 2

INVENTOR
WALTER C. LANNING
BY R. V. Craddock
ATTORNEY

United States Patent Office 2,802,202

Patented Aug. 6, 1957

2,802,202

GATING CIRCUIT

Walter C. Lanning, Plainview, N. Y., assignor to Sperry Rand Corporation, a corporation of Delaware Application July 13, 1955, Serial No. 521,690

12 Claims. (Cl. 340—174)

This invention concerns electrical gating circuits, and more particularly monostable gating circuits for binary digital computing systems.

In a binary digital computing system, a number may be represented by a train of electrical signals uniformly spaced in time, wherein the presence of a pulse designates the number 1 and the absence of a pulse designates the number 0. In an electrical gating circuit for a binary system, the signal from an output terminal is controlled by a signal applied to a remote input terminal. The output signal may be considered to occupy one of two possible states. Thus, where numbers are represented by pulse trains, the output signal is either a continuous series of pulses, representing a binary 1 output state, or no pulses, representing a binary 0 output state.

In a monostable gating circuit, the circuit is stable in one state and unstable in the other state. In the absence of an input signal, the circuit operates in its stable state. To transfer the circuit to its unstable state a proper input signal must be applied. The monostable gating circuit remains in the unstable state for a period of time determined by the parameters of the circuit, after which time it returns to its stable state without the application of any control signal.

It is, therefore, an object of this invention to provide an electrical gating circuit for a binary digital computing system.

It is a further object of this invention to provide a monostable gating circuit for a binary digital computing system.

It is a further object of this invention to provide a monostable gating circuit wherein the duration of the unstable state is controllable.

It is a further object of this invention to provide a monostable gating circuit utilizing magnetic core logic elements.

It is a further object of this invention to provide a gating circuit which is useful as a storage element for a binary digital computing system.

In accordance with the present invention, there are provided first and second NOT logical elements wherein the output signal obtained from each may be delayed for a predetermined interval after insertion of an input signal. The output terminal of the first NOT element is connected to the input terminal of the second NOT element and the output terminal of the second NOT element is connected to the input terminal of the first NOT element to form a loop circuit. An electrical signal introduced into the circuit will become alternately a binary 0 and a binary 1 as it passes around the loop. However, the signal state at any particular point in the loop circuit will remain constant. The insertion of a binary 1 into a portion of the loop where a binary 0 state exists will change the state of the entire loop. A binary 1 is inserted into the monostable gating circuit in that portion of the loop which is 0 in the stable state. This causes the portion of the circuit which is normally 1 in its stable state to change to the 0 state. The binary 1 obtained from an output terminal is passed through a variable delay circuit and returned to that portion of the circuit which is in the 0 state, thereby restoring the circuit to its stable condition.

Other objects and advantages of the present invention will become apparent from the specification taken in connection with the accompanying drawings, wherein.

Figure 1:
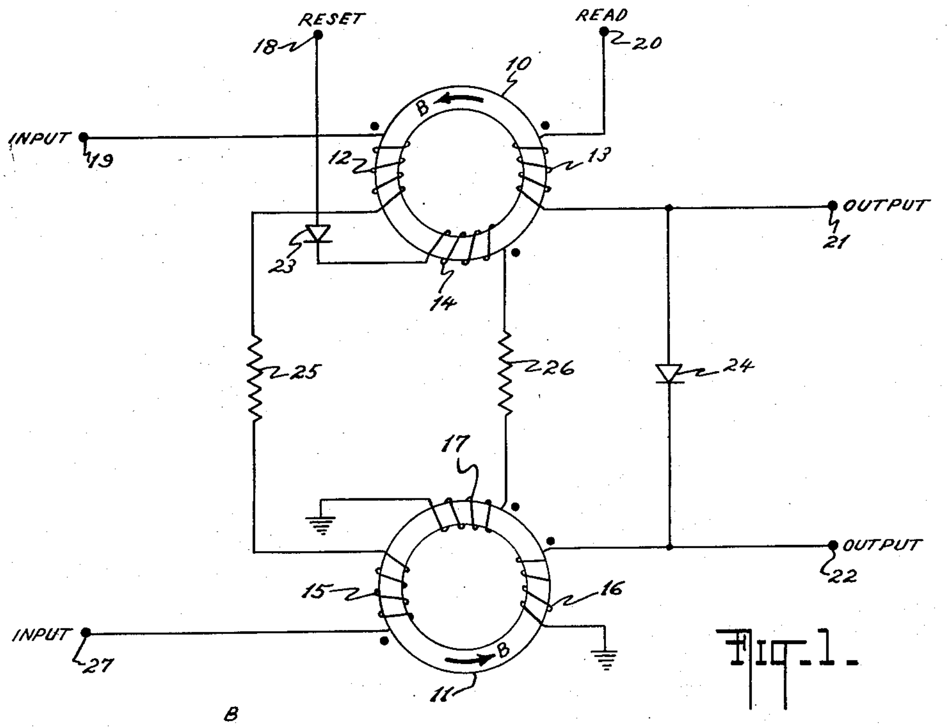
Fig. 1 is a schematic diagram of a circuit element suitable for use in this invention.

A circuit element which is suitable for use in a binary digital computing circuit and which facilitates assemblage of the instant monostable gating circuit is shown in Fig. 1. For purposes of simplicity this circuit element will henceforth be termed a functor. The functor comprises a pair of toroidal magnetic cores 10 and 11, on each core there being wound an input, an output, and a reset winding. Input winding 12, output winding 13, and reset winding 14 are wound on core 10. Input winding 15, output winding 16, and reset winding 17 are wound on core 11. The magnetization effect of each winding on its core is indicated by the presence of a dot on one end or terminal of the winding. Positive current entering the dotted terminal of any winding tends to set up magnetic flux in the core in the arbitrarily assigned positive direction, as shown by the arrows.

Figure 2:
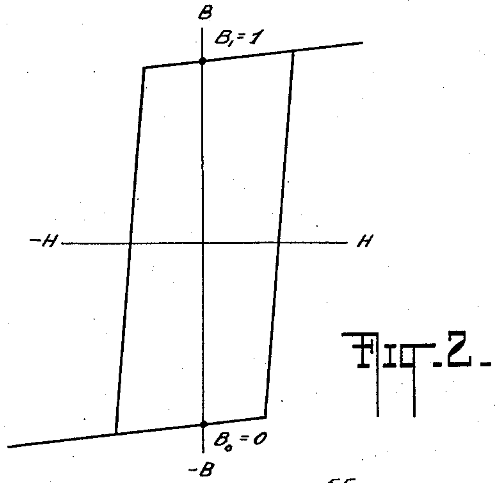
Fig. 2 is a graph illustrating a hysteresis loop of a magnetic material used in the element of Fig. 1.

An idealized hysteresis loop of the cores of the functor is shown in Fig. 2. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magnetized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

Figure 3:
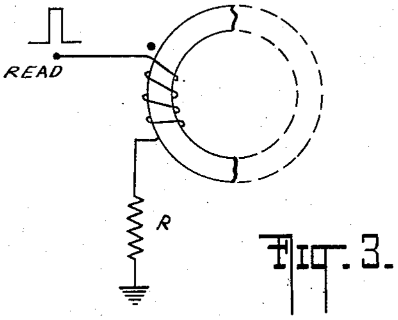
Fig. 3 is a circuit used to illustrate the operation of the element of Fig. 1.

To illustrate how pulses are read out of the functor, the exemplary circuit of Fig. 3 is used. In this circuit a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil will tend to cause no change of remanence state. Consequently, there will be but little voltage induced in the winding, and it acts as a low impedance, so that most of the voltage applied to the read terminal will appear across the resistor.

The appearance of a pulse across the resistor of Fig. 3 occurs when the core is in the unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the presence of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 18 and the read terminal 20 are connected directly to different terminals of the clock source. The input terminal 19 is connected to another terminal of the clock source either directly or through intermediate circuitry which may or may not permit passage of the particular clock pulse to the input terminal 19. It is necessary that the terminals of the clock source be so selected that the cyclical order of pulses energizing the functor windings follow the pattern of reset, input, and read.

The clock pulses applied to reset terminal 18 enter reset winding 14 at its undotted end and reset winding 17 at its dotted end, thereby setting core 10 to 0 and core 11 to 1. A positive pulse applied to input terminal 19 enters input winding 12 at its dotted end and input winding 15 at its undotted end. If no input pulse reaches input terminal 19 during a particular clock cycle, the cores remain in their reset state. However, if a pulse enters input terminal 19, core 10 is set to 1 and core 11 is set to 0.

A pulse applied to the read terminal 20 enters winding 13 at its dotted end. Output terminal 21 acts only as a current source. If core 10 is set to 0, the output winding 13 acts as a high impedance and little current can flow from output terminal 21. Thus, the output signal from output terminal 21 will be a 0 in accordance with the principles explained in connection with Fig. 3. If core 10 is set to 1, the output winding 13 acts as a low impedance and an output pulse, representing the number 1, will appear at output terminal 21.

Output terminal 22, which acts only as a current sink, is connected through intermediate circuitry to the same terminal of the clock source as read terminal 20. With core 11 set to 0, output winding 16 acts as a high impedance and prevents current flow in the intermediate circuitry. Thus, the signal from the terminal 22 may be said to be a 0. If core 11 is set to 1, output winding 16 acts as a low impedance and permits current to flow in the intermediate circuit connected to terminal 22. Thus, the signal from terminal 22 may be said to be a 1.

Summarizing the above analysis, if the input signal to the functor is 1, the output signal from terminal 21 is 1, and the output signal of terminal 22 is 0. On the other hand, if the input signal is 0, the output signal from terminal 21 is 0, and the output signal of terminal 22 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 1, the functor will perform in an opposite manner. In this case, an input 1 will yield an output of 0 at terminal 21 and an output of 1 at terminal 22. Again expressing its operation electrically, if the input is 1, the functor will not deliver a pulse at one output terminal, but will allow reception of a pulse at the other output terminal. Such a functor is designated as a functor one.

In its use in a computing circuit a functor is interconnected with other functors. Thus, in the functor of Fig. 1, input terminal 19 is connected to a current source output terminal of a preceding functor. Input terminal 27 is connected to a current sink output terminal of a preceding functor. Similarly, output terminals 21 and 22 are connected to input terminals of succeeding functors. Thus, input windings 12 and 15 are in series with each other and in series with a preceding current source output terminal and a preceding current sink output terminal. Only if both the preceding current source and the preceding current sink generate an output signal of 1 does a current pulse flow in the input windings 12 and 15. If either or both of the preceding functors generates an output signal of 0, a 0 signal will be applied to the input windings 12 and 15. Thus, the functor zero of Fig. 1 yields a 1 at its current source output terminal, only if both inputs are 1.

In a similar manner, the functor one yields a 1 at its current source output terminal if the inputs are either 1–0 or 0–1, or both 0.

If input terminal 27 is grounded or connected through a return circuit of low impedance any current pulse applied to input terminal 19 will flow unimpeded through both the input windings 12 and 15. Such connection of input terminal 27 is equivalent to having one of the two input signals always equal to 1, i. e., a continuous series of unity digits. A functor zero thus connected yields a 1 at its current source output terminal, and a 0 at its current sink output terminal, whenever the signal to its free input terminal is a 1. In a similar manner, the functor one yields a 1 at its current source output terminal and a 0 at its current sink output terminal whenever the signal to its free input terminal is a 0.

Consequently, if input terminal 27 is grounded, and the output taken from the current source output terminal for a functor one and the current sink output terminal for a functor zero, the functors each act as NOT logical elements; wherein a NOT logical element is defined as one which yields the opposite digit or number of the digit input. A NOT logical element operates on a single binary digital number. Thus, if the input to a NOT logical element is 1, the output is 0, and vice versa.

Figure 4:
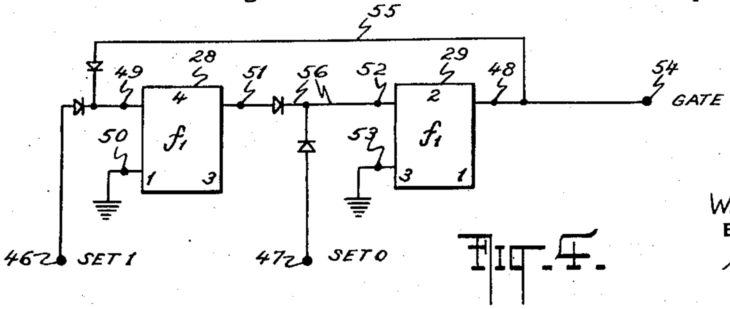
Fig. 4 is a circuit diagram of the gating circuit of this invention.

The gating circuit of this invention, shown in Fig. 4, is constructed by proper interconnection of two functor elements 28, 29 of the type described. In this figure the functor elements are shown as blocks having three terminals, one of the output terminals of the functors not being used. The two terminals on the left of each block represent the input terminals and the terminal on the right represents the output terminal. The output terminal used in this embodiment is the current source output terminal. This circuit is capable of delivering continuously a particular binary digit in response to a proper control signal.

In the block representing each functor are a series of numerals representing clock pulse numbers. The numeral in the lower left corner indicates the number of the clock pulse which energizes the input windings of the functor. The numeral in the lower right corner indicates the number of the clock pulse which energizes the output windings of the functor. The numeral in the top center portion indicates the number of the clock pulse which resets the functor cores.

Figures 5, 6, 7:
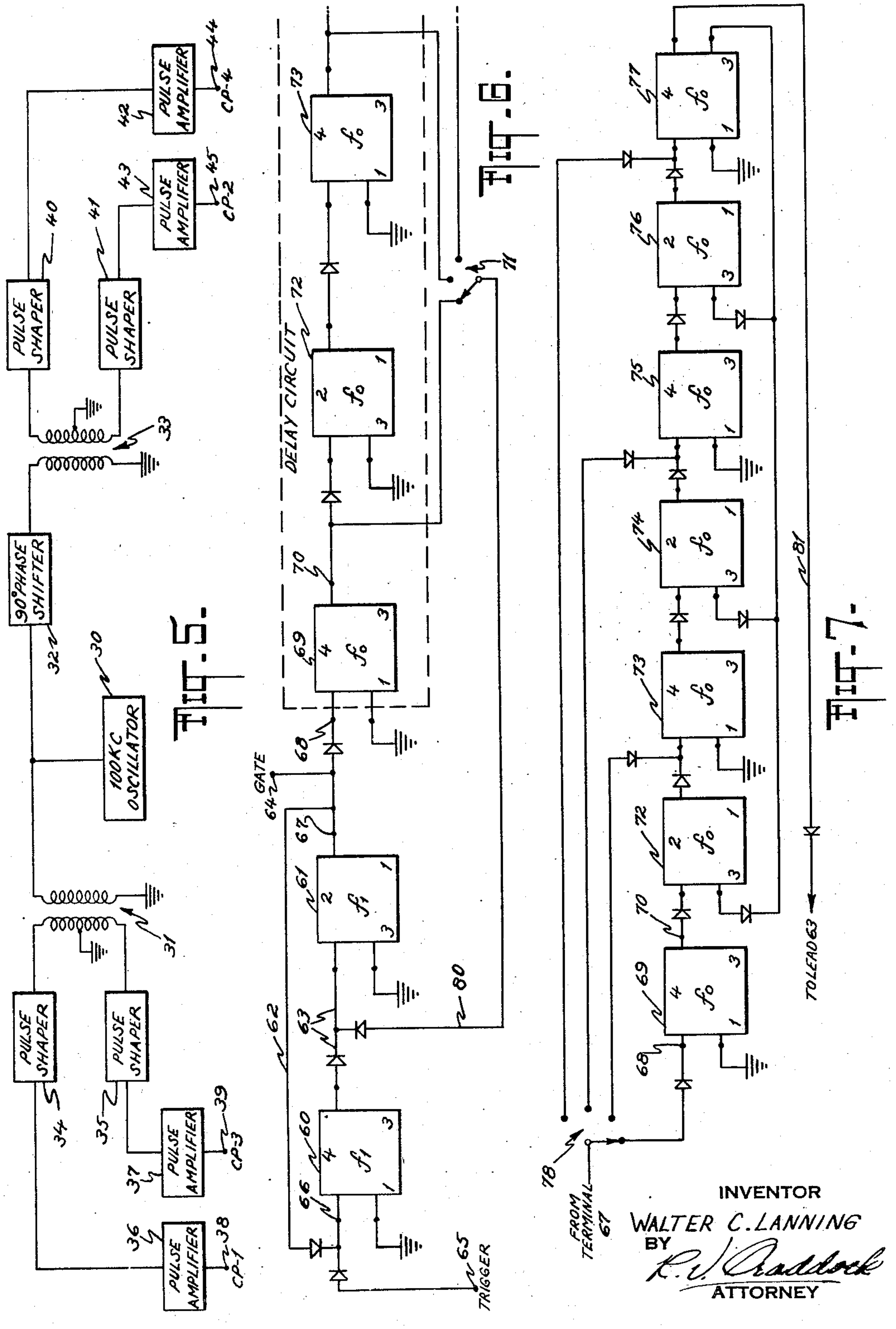
Fig. 5 is a circuit diagram of a clock source to be used in conjunction with the circuit of Fig. 4.
Fig. 6 is a circuit diagram of the preferred monostable gating circuit of this invention.
Fig. 7 is a delay circuit for use with the circuit of Fig. 6.

A clock source for delivering positive pulses to the reset, input, and output windings is shown in Fig. 5. The instant clock source delivers four clock pulses spaced 90° apart during one clock cycle, the clock cycles recurring at 100 kc. A 100 kc. oscillator 30 determines the recurrence frequency of the clock pulses. The output signal of oscillator 30 is split into two portions, one portion being applied to the primary winding of a transformer 31 and the other portion, after being delayed by 90° in phase shifter 32, being applied to the primary winding of a transformer 33. The secondary winding of transformer 31 is center-tapped in order to provide two signals, one from each end of the secondary winding, 180° out of phase with each other. The two signals from the secondary winding of transformer 31 are passed through respective pulse shaper networks 34 and 35 and respective pulse amplifiers 36 and 37 to clock pulse terminals 38 and 39. The secondary winding of transformer 33 is center tapped in order to provide two signals, 180° out of phase with each other, and also 90° out of phase with respect to corresponding signals delivered by the secondary winding of transformer 31. The two signals from the secondary winding of transformer 33 are passed through respective pulse shaper networks 40 and 41 and respective pulse amplifiers 42 and 43 to clock pulse terminals 44 and 45. Thus, the output of the clock source is a series of recurring positive pulses from each of four output terminals. The pulse recurrence frequency of the signal from each terminal is 100 kc. One pulse is delivered from each of the terminals during each cycle of oscillator 30. The clock pulses are delivered in cyclical order from terminals 38, 45, 39 and 44. Terminals 38, 45, 39 and 44 are respectively labeled CP–1, CP–2, CP–3 and CP–4 to indicate the cyclical order of the clock pulse available at that terminal.

Referring again to the circuit of Fig. 4, assume that no trigger pulses are applied to either of the set terminals 46, 47 and that the circuit is so operating that on clock pulse 1 no pulse signal is delivered from output terminal 48 of functor 29. Therefore, on clock pulse 1 a binary 0 is applied to an input terminal 49 of functor 28. Functor 28 is of the functor one type and has its other input terminal 50 grounded. With an input signal of 0, the signal at the current source output terminal 51 of functor 28 will be a 1. This output signal is read from functor 28 on a later clock pulse, such as clock pulse 3, and deliverd as an input signal to an input terminal 52 of functor 29 on this same clock pulse. Functor 29 is of the functor one type and has its other input terminal 53 grounded. Therefore, the signal at the current source output terminal 48 will be 0 for a binary 1 input signal. Thus, on the next clock pulse 1, the signal deliverd at output terminal 48 will be a 0. If the terminal 54 is used as the output or reference terminal of the system, in the absence of any trigger pulses applied to set terminals 46, 47, a constant digital output signal will be delivered at terminal 54. In the instant example, this output signal will be a binary 0. So long as this 0 output signal is being delivered at terminal 54, a 0 signal is being circulated in lead 55, which interconnects terminals 48 and 49, and a 1 signal is being circulated in lead 56, which interconnects terminals 51 and 52.

In order to change the state of operation of this loop circuit, it is necessary to insert a pulse representing the digit 1 into a portion of the circuit where a digit 0 is circulating. In the instant example, if a pulse is applied on clock pulse 1 to set terminal 46, which is connected to input terminal 49, the state of the circuit will be changed. On clock pulse 3 a binary 0 will be read from output terminal 51 and applied to input terminal 52. On clock pulse 1 a binary 1 will be read from output terminal 48 and delivered to input terminal 49 of functor 28. The signal now available at terminal 54 will be a continuous series of pulses, or a binary 1 output. This output will remain unchanged until the application of another trigger pulse to the proper set terminal. When an output of 1 is being delivered at terminal 54, a binary 1 is circulating in lead 55 and a binary 0 in lead 56. Thus, to change the state of the circuit so as to deliver a binary 0 at terminal 54, a binary 1 must be applied to lead 56, by applying a pulse to set terminal 47 on clock pulse 3.

To summarize the operation of the circuit of Fig. 4, a binary 1 signal applied to set terminal 46 will cause the circuit to either change its output to a binary 1 or to continue to deliver a binary 1 output. A binary 1 signal applied to set terminal 47 will cause the circuit to either change its output to a binary 0 or to continue to deliver a binary 0 output. Hence, the circuit also acts as a storage device, whereby setting a binary 1 into the system causes the circuit to continuously deliver at its output terminal a binary 1 and to recirculate this digit for further use. In a similar manner the introduction of a binary 0 in the circuit causes a binary 0 to be delivered continuously at the output terminal.

The circuit of Fig. 4 may be modified by additional elements to operate as a monostable gating circuit. Such a monostable gating circuit is shown in Fig. 6, in which the functors 60, 61 and their interconnecting leads 62, 63 operate in a manner similar to the gating circuit of Fig. 4. In its stable state of operation this circuit delivers a binary 0 output signal at terminal 64, and a binary 0 signal circulates in lead 62 and binary 1 signal circulates in lead 63. The state of operation of this loop circuit is changed by applying a trigger pulse concurrently with clock pulse 1 to trigger terminal 65, which is connected to input terminal 66 of functor 60. As described in connection with Fig. 4, the state of operation of the loop circuit will be changed so that a binary 1 signal will circulate in lead 62 and a binary 0 signal in lead 63, the output from terminal 64 now being a binary 1.

However, on the next clock pulse 1 after application of the trigger pulse not only will a binary 1 be circulated in lead 62 from output terminal 67 of functor 61, but also a binary 1 will be delivered to input terminal 68 of functor 69. Functor 69 is of the functor zero type, having one grounded input terminal, and delivers at its current source output terminal 70 the same signal which is inserted at input terminal 68. On clock pulse 3 a binary 1 is read from output terminal 70, and delivered to one contact of the multicontact switch 71, which is shown with its rotatable arm connected to this contact. The signal from terminal 70 will pass through switch 71 and lead 80 to lead 63. Since a binary 0 is circulating in lead 63 the application of the binary 1 on clock pulse 3 will change the state of the circuit back to its stable condition wherein the output from terminal 64 is a binary 0.

In the operation thus described only a single pulse, or a single binary 1, was delivered from terminal 64. If it is desired to deliver a greater number of binary 1's from terminal 64, i. e., if it is desired that the circuit remain in its unstable condition for a longer duration, additional functor elements may be connected between the output terminal 67 and lead 63 in order to serve as a delay circuit. Thus, if three functors are used in the delay circuit, each functor effectively holding the signal which is to be fed back to lead 63 for two clock pulses, two binary 1's will be delivered at terminal 64.

Although the circuit of Fig. 6 will normally deliver two binary 1's for every trigger pulse, it must remain inoperative for at least two clock cycles after its return to the stable state. This is due to the fact that each binary 1 output signal delivered during the unstable period will also be stored in the delay circuit and will be delivered to lead 63 after experiencing the same delay as the first binary 1 output signal delivered during the unstable period. Any attempt to trigger the gating circuit after return of the first binary 1 to lead 63, but before the return of the last binary 1 from the delay circuit, will result in failure, as each returning binary 1 will restore the circuit to its stable or 0 state. Consequently the circuit of Fig. 6 cannot be triggered immediately after its return to the stable state for as long a period at the circuit was in its unstable state.

Fig. 7 discloses an alternative delay circuit for use with the monostable gating circuit of Fig. 6. This delay circuit permits triggering of the gating circuit on the next clock cycle after return of the gating circuit to the zero state. This is accomplished by erasing all the binary 1's stored in the delay circuit simultaneously with delivery of the first binary 1 to lead 63. The delay circuit of Fig. 7 comprises the cascade-connected functors 69, 72, 73, 74, 75, 76 and 77, each being of the functor zero type. The current source output terminal of each functor is connected to one of the input terminals of the next functor in the cascade. The other input terminals of respective alternate functors 69, 73, 75 and 77 are connected to ground. The other input terminals of respective alternate functors 72, 74 and 76 are connected in parallel to the current sink output terminal of functor 77, the last or output functor of the cascade delay chain, the output terminal of functor 77 delivering a binary 1 until storage of a binary 1 in functor 77.

In its operation, if the delay switch 78 is actuated to input terminal 68 of functor 69, the full delay of the delay circuit will be introduced. The unstable state of the gating circuit will be four clock cycles in duration and will result in four binary 1's being delivered at gate terminal 64. During this period the first binary 1 will have entered the delay circuit and moved from functor 69 to functor 77 through the intervening functors, where it becomes stored simultaneously with delivery of the fourth binary 1 at terminal 64 on clock pulse 1. Binary 1's will also be stored in functors 69, 73 and 75 at this time as a result of the three output signals. The binary 1 will be read from the current source output terminal of functor 77 and delivered through lead 81 to lead 63 on the next clock pulse 3, thereupon restoring the gating circuit to its stable state. Simultaneously with this delivery of the binary 1 from the current source output terminal of functor 77, the current sink output terminal will deliver a binary 0. Since the current source output terminals of functors 69, 73 and 75 are connected through input windings of respective functors 72, 74 and 76 to the current sink output terminal of functor 77, the binary 1's stored in functors 69, 73 and 75 cannot be read into and stored in respective functors 72, 74 and 76, and are thereby erased. No further binary 1's will be read from the delay circuit, and the gating circuit may be triggered immediately.

Delay switch 78 is provided for altering the duration of the unstable state of the gating circuit by causing the introduction of the output binary 1's into different portions of the delay circuit. Although the duration is shortened, the gating circuit may still be retriggered on the next clock cycle after its return to the stable state.

While the functors used and their interconnections described in reference to the gating circuit of Fig. 4 and the monostable gating circuit of Fig. 6 represent the preferred embodiment of this invention, modifications may be made in the circuit without departing from the spirit of this invention. For example, functors 28, 29, 60 and 61 may all be of the functor zero type. In such case the current sink output terminal of functor 28 would be connected to an input terminal of functor 29 and the current sink output terminal of functor 29 would be connected to an input terminal of functor 28. Current sink output terminals and input terminals of functors 60 and 61 would be similarly interconnected. Since each functor still acts as a NOT logical element having a predetermined delay between input and output signals, the circuits will perform as explained heretofore.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gating circuit operable in two states, comprising first and second functor elements each having an input terminal and a NOT output terminal, the NOT output terminal of the first functor being connected to the input terminal of the second functor and the NOT output terminal of the second functor being connected to the input terminal of the first functor.

2. A gating circuit comprising first and second functor elements each having an input terminal and a NOT output terminal, first and second leads adapted to receive respective signals for opening and closing the gating circuit, the NOT output terminal of the first functor and said first lead being connected in parallel to the input terminal of the second functor, and the NOT output terminal of the second functor and said second lead being connected in parallel to the input terminal of the first functor, whereby the gating circuit may be opened or closed by signals applied to said first and second leads.

3. A gating circuit comprising first and second functor elements each having an input terminal and a NOT output terminal, means for generating electrical clock pulses at a plurality of terminals, the pulses generated at a particular one of said terminals having the same recurrence frequency as the pulses generated at the other terminals but being non-coincident in time with said other pulses, whereby successive pulses from all the terminals within one pulse period constitute a clock cycle, first and second leads adapted to receive respective signals for opening and closing the gating circuit, the NOT output terminal of the first functor and said first lead being connected in parallel to the input terminal of the second functor, and the NOT output terminal of the second functor and said second lead being connected in parallel to an input terminal of said first functor, the read terminal of said first functor being connected to a first terminal of said clock means and the read terminal of said second functor being connected to a second terminal of said clock means, the pulse output of said second clock terminal occurring later in the clock cycle than the pulse output of said first clock terminal.

4. A gating circuit comprising first and second NOT logical elements each having an input terminal and an output terminal, wherein the output signal obtained may be delayed for a predetermined interval after insertion of an input signal into said logical elements, first and second leads adapted to receive respective signals for opening and closing the gating circuit, the output terminal of the first NOT element and said first lead being connected in parallel to the input terminal of the second NOT element, and the output terminal of the second NOT element and said second lead being connected in parallel to the input terminal of the first NOT element, whereby the gating circuit may be opened or closed by signals applied to said first and second leads.

5. A gating circuit comprising first and second functor elements of the type whose output signal represents the NOT of its input signal, first and second leads adapted to receive respective signals for opening and closing the gating circuit, the NOT output terminal of the first functor and said first lead being connected in parallel to an input terminal of the second functor, and the NOT output terminal of the second functor and said second lead being connected in parallel to an input lead of said first functor, whereby the gating circuit may be opened or closed by signals applied to said first and second leads.

6. In combination, first and second functor elements each having an input terminal and a NOT output terminal, and a delay means having an input terminal and an output terminal, the NOT output terminal of said first functor being connected to the input terminal of the second functor, the NOT output terminal of the second functor being connected to the input terminal of the first functor and to the input terminal of the delay means, and the output terminal of the delay means being connected to the input terminal of the second functor 7. A monostable gating circuit comprising first and second NOT logical elements each having an input terminal and an output terminal, wherein the output signal obtained may be delayed for a predetermined interval after insertion of an input signal into said logical elements, a lead adapted to receive a signal for operating the gating circuit into its unstable state, a delay means having an input terminal and an output terminal, the output terminal of the first NOT element being connected to the input terminal of the second NOT element, the output terminal of the second NOT element being connected to the input terminal of the first NOT element and to the input terminal of the delay means, the output terminal of the delay means being connected to the input terminal of the second NOT element and said lead being connected to the input terminal of said first NOT element.

8. A combination as in claim 6, wherein said delay means comprises a plurality of series-connected functor elements.

9. A monostable gating circuit comprising first and second functor elements each having an input terminal and a NOT output terminal, means for generating electrical clock pulses at a plurality of terminals, the pulses generated at a particular one of said terminals having the same recurrence frequency as the pulses generated at the other terminals but being non-coincident in time with said other pulses, whereby successive pulses from all the terminals within one pulse period constitute a clock cycle, a lead adapted to receive a signal for operating the gating circuit to its unstable state, a delay means comprising a plurality of series-connected functor elements, the NOT output terminal of said first functor being connected to the input terminal of said second functor, the NOT output terminal of said second functor being connected to the input terminal of said first functor, and to the input terminal of the delay means, said lead being connected to the input terminal of said first functor, and means for connecting the input terminal of said second functor to selected output windings of the series-connected functors of said delay means, the read terminal of said first functor being connected to a first terminal of the clock means, and the read terminal of said second functor being connected to a second terminal of the clock means, the pulse output of said second clock terminal occurring later in the clock cycle than the pulse output of said first clock terminal, the read terminal of said selected output windings of said delay functors being connected to said first clock terminal.

10. A monostable gating circuit comprising first and second NOT logical elements each having an input terminal and an output terminal, wherein the output signal obtained may be delayed for a predetermined interval after insertion of an input signal into said logical elements, the output terminal of the first NOT element being connected to the input terminal of the second NOT element, and the output terminal of the second NOT element being connected to the input terminal of the first NOT element, and a delay means having a delay equal to an odd integer times the predetermined delay interval of said NOT logical elements, said delay means being interconnected between the output and the input terminals of the second NOT element.

11. A delay circuit comprising an odd number of cascade-connected functor elements, the first, last, and intervening alternate functor elements in said cascade being designated as odd-numbered elements and the remaining functor elements of said cascade being designated as even-numbered elements, one of the output terminals of each functor being connected to one of the input terminals of the next following functor elements in the cascade, and the other input terminals of said even-numbered functor elements being connected in parallel to one output terminal of the last functor element of the cascade.

12. A delay circuit comprising an odd number of cascade-connected functor zero elements, the first, last, and intervening alternate functor elements in said cascade being designated as odd-numbered elements and the remaining functor elements of said cascade being designated as even-numbered elements, one of the output terminals of each functor being connected to one of the input terminals of the next following functor element in the cascade, and the other input terminals of said even-numbered functor elements being connected in parallel to the current sink output terminal of the last functor element of the cascade.

References Cited in the file of this patent

UNITED STATES PATENTS

| | | |
|---|---|---|
| 2,710,928 | Whitney | June 14, 1955 |
| 2,713,674 | Schmitt | July 19, 1955 |
| 2,741,758 | Cray | Apr. 10, 1956 |
| 2,729,808 | Auerbach, et al. | Jan. 3, 1956 |

OTHER REFERENCES

Magnetic Delay Line Storage (An Wang) Proceedings of the IRE, April 1951, pages 401 to 407.

Static Magnetic Storage and Delay Line (An Wang, et al.) Journal of Applied Physics. January 1950, pages 49 to 54.